United States Patent [19]

Eisenhard et al.

[11] 4,380,047
[45] Apr. 12, 1983

[54] INTERFACE APPARATUS EMPLOYING A VIDEO TAPE DRIVE TO BACK-UP A DISC DRIVE AND INCLUDING ERROR DETECTING AND CORRECTING CIRCUITRY

[75] Inventors: Bruce T. Eisenhard, Cupertino; Mark C. Hahn, San Jose, both of Calif.

[73] Assignee: Corvus Systems, Inc., San Jose, Calif.

[21] Appl. No.: 209,903

[22] Filed: Nov. 24, 1980

[51] Int. Cl.³ .................... G06F 3/06; G11B 5/008; G11B 5/012

[52] U.S. Cl. .................... 364/200; 360/15

[58] Field of Search ... 364/200 MS File, 900 MS File; 360/15, 18, 19, 33, 39

[56] References Cited

U.S. PATENT DOCUMENTS 4,000,510 12/1976 Cheney et al. .................... 364/900 X
4,041,463 8/1977 Slutzky et al. .................... 364/900

Primary Examiner—Thomas M. Heckler
Attorney, Agent, or Firm—Limbach, Limbach & Sutton

[57] ABSTRACT

An interface apparatus between a video tape recorder and a disc drive having a non-removable magnetic storage medium and a controller is disclosed. The video tape recorder provides memory back-up to data stored on the disc drive. The interface apparatus comprises a data bus for transferring the data between a shift register in the interface to the controller of the disc drive. The shift register transforms the parallel data from the controller to serial data when data is being written onto the VTR, and transforms the serial data from the VTR to parallel format when data is being read into the disc drive. The interface appartus has a clock for generating video signals. In addition, a circuit separates the sync and data portions of the video signal when the video signal is read from the tape of the VTR into the controller. A CRC generator checks for errors in the transmission of data to and from the video tape recorder. A control state machine which is responsive to the read/write signal from the controller generates a start bit, a data clock and shift signal to shift the shift register in its appropriate timing. The start bit is used when data is being written from the disc drive to the tape recorder. The apparatus can also be used in a computer system.

18 Claims, 5 Drawing Figures

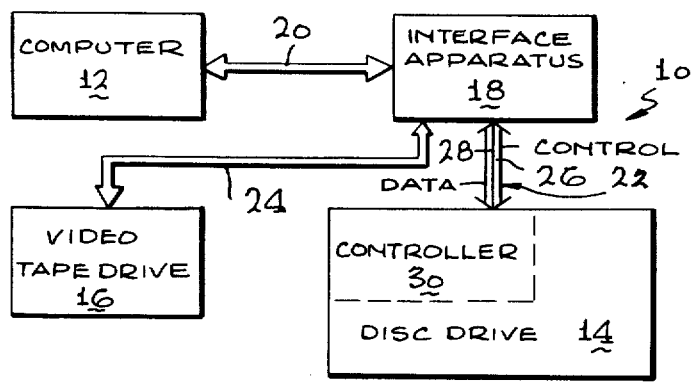
FIG. 1
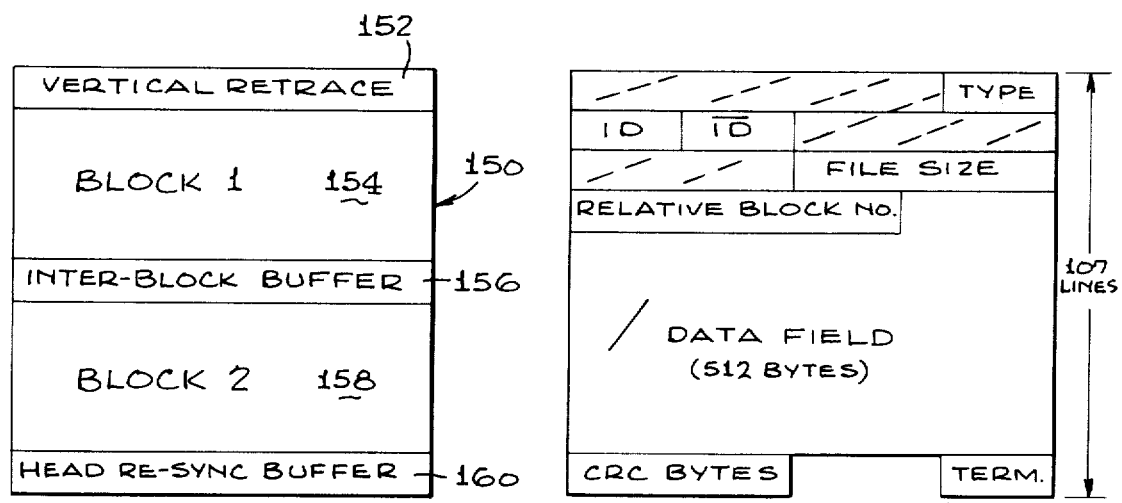
FIG. 3
FIG. 4
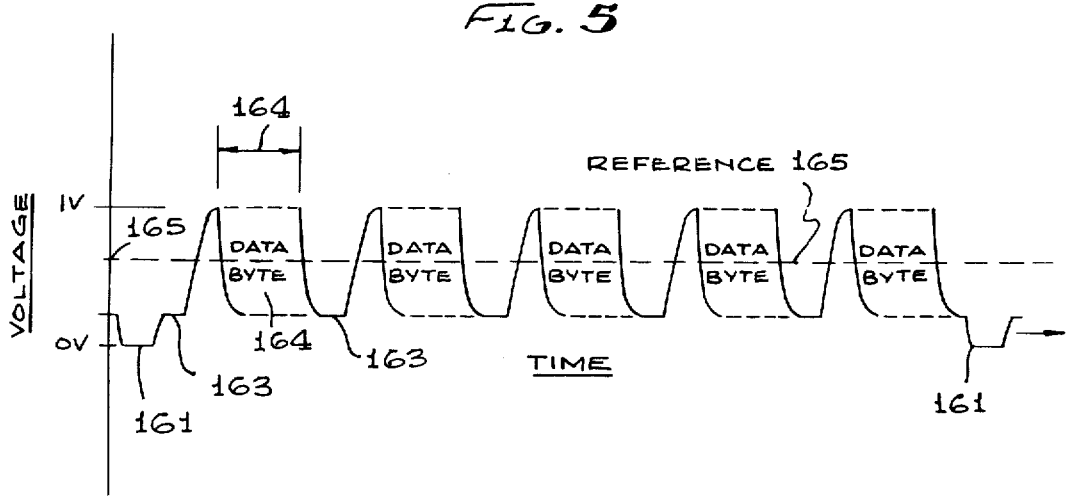
FIG. 5

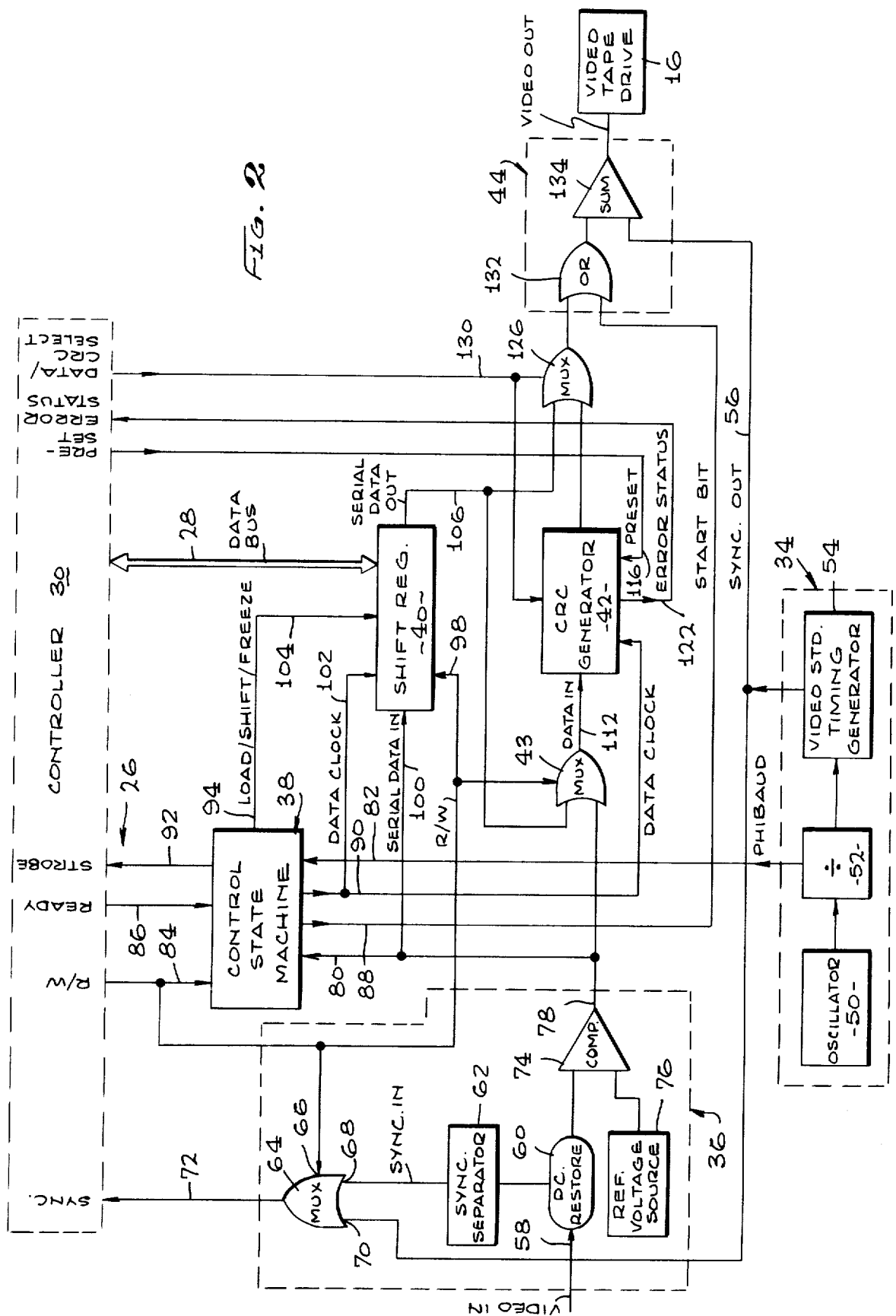

INTERFACE APPARATUS EMPLOYING A VIDEO TAPE DRIVE TO BACK-UP A DISC DRIVE AND INCLUDING ERROR DETECTING AND CORRECTING CIRCUITRY

BACKGROUND OF THE INVENTION

1. Field of the Invention

The present invention relates generally to interface apparatus in a computer system, and more particularly to an interface apparatus employing a video tape drive to back-up a disc drive having a non-removable magnetic storage medium, including error detecting and correcting circuitry, and the computer system employing same.

2. Description of the Prior Art

Conventional data processing systems have employed a computer or central processing unit (CPU), one or more memories for storing data on a magnetic storage medium and a controller for controlling and synchronizing the transfer of data within the system. One particular configuration of such a system includes a disc drive having a memory in which the magnetic transducers and magnetic discs are hermetically sealed in a cartridge and a controller. This configuration is commonly known in the industry as a "Winchester." A disadvantage of relying solely on a single memory to store data is the severe consequences associated with losing the data recorded on the disc. This could arise when a magnetic transducer crashes into a portion of the recording surface of the magnetic disc. For example, the data may comprise the unique business information, such as sales, gross receipts, expenses, tax records, etc., of a business or corporation. Hence, back-up memories have been employed in some data processing systems.

In the past, back-up systems have been relatively costly and in many cases have been unreliable in that when used in a back-up situation, they provided back-up data that included errors and, hence was not identical to the data originally stored on the magnetic disc.

SUMMARY OF THE INVENTION

It is therefore an object of the present invention to provide an apparatus for providing memory back-up on a video tape drive for a disc drive having a non-removable storage medium.

Another object of the present invention is to provide such an apparatus at a relatively low cost.

Still another object of the present invention is to provide such an apparatus that employs start/stop serialization which provides improved noise immunity and allows the use of relatively simple electronic circuitry.

Yet another object of the present invention is to provide a computer system including a disc drive having a microprocessor controller and a non-removable storage medium, a video tape drive, and an interface apparatus, the system configured to provide a back-up for information stored on the non-removable storage medium.

Briefly, the preferred embodiment of the present invention comprises a video tape drive including magnetic tape for recording a video signal or for playing back a video signal corresponding to that previously stored on a non-removable magnetic storage medium, the disc drive including a controller and a non-removable storage medium, the controller providing a read-/write control signal, a ready control signal, a sync control signal, a strobe control signal, a preset control signal, an error status control signal and a data/CRC select control signal, and an interface apparatus including a data bus of the 8-bit type, a control bus of the 7-bit type for carrying the control signals, a video timing generator for providing the sync signal and a clock signal determinative of the data stream transmission rate (phi baud), playback circuitry responsive to the video signal and operative to separate the signal into a sync portion and a data portion and to develop the sync signal and a data signal representative of data arranged in a serial manner therefrom, a control state machine responsive to the data signal, the read-write control signal, the ready control signal, the strobe control signal and the clock signal and operative to generate a start bit, a data clock and a shift signal, a shift register coupled to the playback circuitry and the control state machine and being responsive to the data signal, the data clock and the shift signal and operative when in the playback condition to transform the data arranged in a serial manner into a parallel stream of data and to apply the parallel stream onto the data bus for transfer to the non-removable storage medium of the disc drive and when in the record condition to transform the parallel stream of data into a serial stream of data, a CRC generator responsive to the data signal or the serial stream of data, the data clock, the preset control signal and the data/CRC select control signal and operative to develop an error status control signal when in the playback condition, and a CRC coded signal when in the record condition, and output summing circuits responsive to the serial stream of data output from the shift register, the start bit, the CRC coded signal and the sync signal and operative to provide a CRC coded video output signal to the video tape recorder upon the occurrence of a start bit when the apparatus is in a record mode.

An advantage of the present invention is that it provides a relatively low cost back-up for data stored in a disc drive having a non-removable storage medium.

Another advantage of the present invention is that it employs a relatively low cost video tape drive configured in a manner to store on video tape, data contained on a non-removable storage medium in a disc drive.

Still another advantage of the present invention is that it employs start/stop serialization which, in turn, provides improved noise immunity and allows the use of a relatively simple apparatus.

Yet another advantage of the present invention is that it can be configured in a computer system.

Still another advantage of the present invention is that it is fabricated with commonly available off-the-shelf components.

Other objects and advantages of the present invention will no doubt become apparent to those skilled in the art after having read the following detailed description of the preferred embodiment which is illustrated in the several figures of the drawing.

IN THE DRAWING

FIG. 1 is a block diagram of a computer system for providing memory back-up on a video tape recorder to a disc drive having a non-removable storage medium in accordance with the present invention;

FIG. 2 is a schematic block diagram of an interface apparatus for providing memory back-up on a video tape recorder in accordance with the present invention; and FIGS. 3-5 illustrate the format and waveforms of the video signal employed in the system and interface apparatus illustrated in FIGS. 1 and 2.

DETAILED DESCRIPTION OF THE PREFERRED EMBODIMENT

Referring now to FIG. 1 of the drawing, a system 10 for providing memory back-up is shown in block diagram form in accordance with the present invention. The apparatus 10 comprises a host computer 12, a disc drive 14, a video tape drive 16 and interface apparatus 18. Bus 20 interconnects the computer 12 and the apparatus 18; bus 22 interconnects the interface apparatus 18 and the disc drive 14; and a video cable 24 interconnects the video tape recorder 16 and the interface apparatus 18. The bus 22 includes a control bus shown generally by the numeral 26 and a data bus 28. The control bus 26 is of the 7-bit type and carries 7 control signals comprising a sync control signal, a read/write (R/W) control signal, a ready control signal, a strobe control signal, a preset control signal, an error status control signal and a data/CRC select control signal. As will be subsequently described, the ready control signal and the strobe control signal sequentially combine in such a manner to effect a "handshake" operation. The data bus 28 is of the 8-bit type and carries 8 lines of data.

The disc drive 14 is one having a non-removable magnetic storage medium, transducers for recording or reproducing data on the storage medium (not shown), and a controller or microprocessor 30 for controlling the operation of the interface apparatus 18 via the seven control signals to effect the transfer of data via the data bus. In the preferred embodiment the disc drive is a Corvus 11 disc drive manufactured by Corvus Inc. of San Jose, Calif., although any disc drive of the type employing technology commonly known as Winchester technology may be used.

The tape drive 16 is a conventional video tape recorder including a cassette on which is stored video magnetic tape for video applications, and transducers mounted on a rotatable circular scanner assembly for recording and/or reproducing video signals. The scanning assembly generally includes one or more transducing heads which operate to translate electrical signals to magnetic variations for storage on the video tape during the record operation or which operate to translate magnetic signals from the tape into the original signal during the playback or reproduce operation.

With reference also to FIG. 2, the interface apparatus 18 is illustrated in a schematic block diagram. The apparatus 18 includes a reference signal generating circuit 34, a circuit 36 for separating the sync and data portions of a video signal, a control state machine 38, a shift register 40, a cyclical redundancy check (CRC) generator 42, and video output summing circuits 44.

The circuits for generating reference or timing signals 34 include an oscillator 50 for providing a 14.32 Megahertz (MHz) signal, dividing circuits 52 for dividing down the output signal of the oscillator and for developing a 3.58 Megahertz signal and a 1.1 MHz clock signal designated as a phi baud signal, which, as will be subsequently described, determines the data stream transmission rate. The frequency of the phi baud signal is selected to provide the video format as illustrated in FIGS. 3-5 of the drawings in accordance with the requirement of providing 5 bytes per horizontal line of video signal, although other frequencies could be used corresponding to different line byte packing. A video standard timing generator 54 converts the 3.58 MHz signal into a synchronizing or sync out signal which is applied on line 56. The timing signals are selected to be compatible with NTSC and PAL video standards for usage in the United States and Europe, respectively. In the preferred embodiment the timing generator is one produced by Signetics and identified as 2621/2622, and includes a set of counters that divide the clock to generate the horizontal and vertical sync signals.

The circuits 36 include an input 58 adapted to receive a video signal stored in the video tape drive 16 when the apparatus is in the playback mode, a DC restore circuit 60, a sync separator circuit 62, a multiplexer (MUX) 64 having a control input 66, an input 68 for receiving a sync in signal from the sync separator 62, an input 70 connected to line 56 for receiving the sync out signal supplied by the video standard timing generator 54 and an output 72. The multiplexer 64 responds to the read/write control signal applied at input 66 and serves to conduct either the sync in signal applied at input 68 to the output 72 when the video tape recorder is in the playback mode, and conversely serves to conduct the sync out signal applied at input 70 to the output 72 when the tape recorder is in the record mode. In the preferred embodiment, the multiplexer 64 is model 74LS157, a common TTL part available from a variety of vendors, and the DC restore circuit 60 and sync separator circuit 62 comprise a circuit having two transistors configured as recommended in the NTSC video standards.

A comparator 74 includes an input coupled to the DC restore circuit 60 and an input coupled to a reference voltage source 76 and serves to provide a data input signal on its output 78 when the level of the DC restore signal exceeds that of the reference voltage. The reference voltage source 76 provides an output having a constant voltage at a level between 0.5 and 0.8 volt, preferably at 0.66 volts.

The control state machine 38 includes input terminals 80, 82, 84 and 86 and output terminals 88, 90, 92 and 94. The input terminal 80 provides the data input signal, the input terminal 82 provides the phi baud clock signal, the input terminal 84 supplies the read/write control signal, and the input terminal 86 provides the ready control signal to the control state machine. The output 88 supplies the start bit signal, the output 90 provides the data clock, the output 92 provides the strobe control signal and the output 94 provides the shift signal which controls the loading, shifting or freezing of the state of the shift register 40.

The state diagram of the control state machine 38 for the record and playback modes or conditions is illustrated in the following chart.

| STATE DIAGRAMS | |
|---|---|
| next state condition: | outputs: |

RECORD MODE:

STATE DIAGRAMS

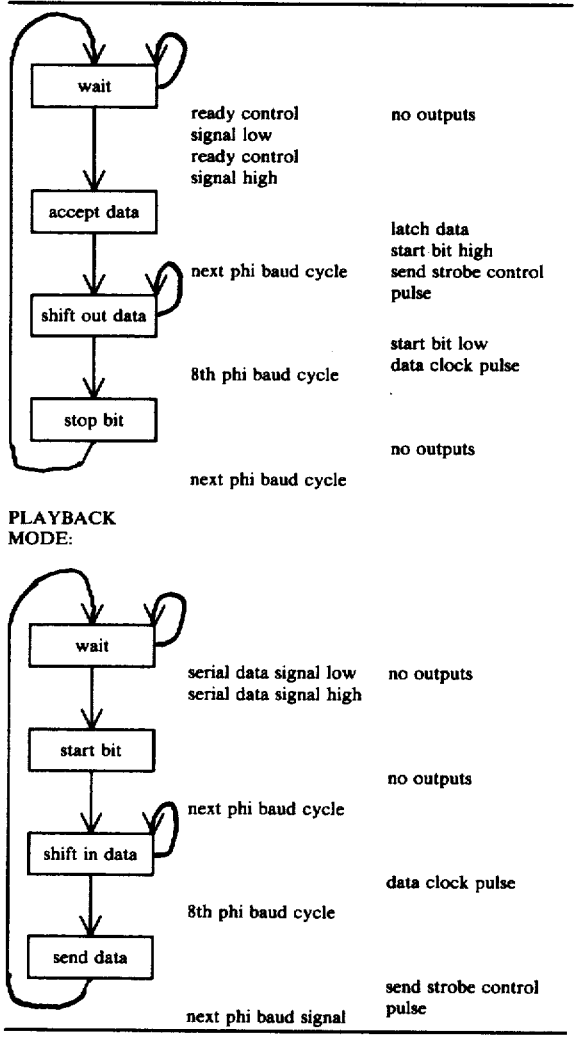

As illustrated in the chart, the control state machine 38 is operative in the record and playback modes. In its initial state it is in the wait condition which ends upon receipt of the high ready control pulse signal when in the record mode. In the wait condition there are no outputs. Upon application of a strobe control signal via terminal 92 when in the record mode the acceptance of data is indicated. The next state either generates (or skips) the data start bit in the record (or playback) mode respectively. Eight data clocking states then follow during which the data is either shifted into or out of the shift register 40. Another idle state follows which either produces or skips the stop bit. During playback a strobe control signal is sent via terminal 92 to represent the valid data in the shift register during this last state. The control state machine thereafter returns to the wait idling condition. It should be noted that during the playback mode the initial condition is the wait state which ends upon the generation of a start bit.

In the preferred embodiment, the control state machine comprises 5 flip-flops, 2 counters, and several gates of the AND, OR and INVERTER types; and samples the inputs described in the state diagram on each clock edge, proceeding from state to state on each phi baud clock signal. In addition, the counters provide the timing for the 8 clock shift in/out states, with the control signals being derived from the present state of the control circuit.

The shift register 40 includes a read/write input 98 for receiving the read/write control signal, a data input 100 for receiving the data signal from the output 78 of the comparator 74, a data clock input 102 for providing the data clock signal supplied by the control state machine 38, an input 104 for receiving the shifting direction to either load, shift or freeze the state of the shift register from the control state machine 38, and output 106 on which the shift register provides a data output signal carrying the data formatted in a serial manner. The data bus 28 provides 8-bits of data in a bi-directional manner either out of or into the shift register in a parallel manner. In the recording mode the shift register is parallel loaded via the data bus 28 and the data is shifted out through the terminal 106 following the application of the start bit over line 88 from the control state machine 38 and continuing the shifting upon the occurrence of each clock pulse. During the playback mode the shift register serves to convert the serial data input at 100 into an 8-bit parallel format and load it onto the data bus 28 for transfer to the disc drive 14. In the preferred embodiment, the shift register 40 is one designated as model 74LS299.

The CRC generator 42 is of the conventional type used for detecting and correcting errors that occur in data that is organized in a serial data stream and includes an input 112 for providing input data, input 114 for providing the data clock from the control state machine, input 116 for providing the preset control signal from the controller of the disc drive, input 117 for providing the data/CRC select control signal, output 120 for providing the output with a check sum formed thereon in which the CRC modifies the data input signal and the output 122 which provides the error status control signal to the disc drive controller 14. The CRC generator 42 conceptually is based on an extension of the concept of parity in which the incoming data stream is shifted and added with itself to produce a code remainder, which is described as the remainder produced when the incoming data stream is divided by the code polynomial and serves to monitor the bit stream of data being recorded during the record mode and to provide a check sum indicative of the remainder to the block following the last data byte. Prior to transmission of the data, the CRC preset control signal applied to input 116 initializes the CRC generator 42. At a time following the last of the data, the data/CRC select control signal applied via input 117 causes the CRC generator to generate the check sum of the block. A multiplexer 43 receives the data output signal via terminal 106 from the shift register when in the record mode or the data signal from the comparator 74 when in the playback mode and to selectively conduct the data signal therethrough to line 112 depending upon the state of the read/write control signal applied to its control gate. A multiplexer 126 receives the data output signal via terminal 106 when in the record mode and the CRC coded data on output 120 of the CRC generator 42 and serves to selectively conduct one of the signals in accordance with the condition of the data/CRC select control signal applied via terminal 130. On playback the data is input to the CRC generator and a remainder is produced, which is then compared by the generator to the remainder that was recorded with the data. If the two remainders are equal, a NO ERROR condition is indicated on the error status line 122. In the preferred embodiment, the CRC generator is a chip manufactured by Fairchild Camera and Instruments designated as Model 9401 and used in the CRC-16 code mode.

The video summing circuit 44 includes an OR gate 132 and a summer 134 and is operative during the record mode. The OR gate 132 is connected to the output of the multiplexer 126 and to the output 88 of the control state machine 38 which supplies the start bit. The OR gate serves to conduct the data applied thereto upon the occurrence of the start bit. The summer 134 serves to conduct the data output from the shift register upon the occurrence of the sync out signal via line 56 to its output for application to the input of the video tape drive 16.

Referring now to FIGS. 3–5, the format of the video signal processed in the apparatus of the present invention is illustrated. FIG. 3 illustrates a video field 150 including a vertical retrace portion 152, block 1 designated by the numeral 154, an interblock buffer 156, block 2 designated by the numeral 158 and a head resync buffer 160. The vertical retrace 152 ends at the start of the visible portion of the video signal.

FIG. 4 indicates the details of the format of the block 154 which comprises 107 lines. At the end of the first line is a TYPE byte followed on the second line by field information, which includes the file ID and its complement $\overline{ID}$. The TYPE byte indicates whether this block contains header, data or trailer information. The third line includes the data relating to the file size and the fourth line includes data regarding the relative block number within the file. This is followed by the data field which comprises 512 bytes of data. The last line includes CRC byte information and the termination byte.

Referring now to FIG. 5, a video signal representative of one horizontal line as it would appear on a cathode ray tube screen is illustrated. The video signal includes a zero volt level 161, a one volt peak point 162, and intermediate pedestal 163 representative of the "black" level as observed on a television. The reference voltage level supplied by source 76 and applied to the comparator 74 is represented by the level 165 which is the average of the black 163 and white 162 levels. The pedestal 161 represents the horizontal retrace portion and is not normally visible on a television. The swing from the intermediate pedestal 163 to one volt peak 162 represents the start bit portion, and the portion 164 between the end of the start bit and a succeeding intermediate pedestal represents the information forming the data byte. As shown, one horizontal line of video information comprises five bytes of data, each byte including a start bit, a data byte and a stop bit. After 240 horizontal retraces a vertical retrace appears again (also see FIG. 3). Horizontal retraces are triggered by pulses having a magnitude below the video black level. This indicates line boundaries for the television and is in accordance with video recording standards. Due to the high bandwidth of the video signal and to the necessity to interrupt data transmission during horizontal and vertical retrace portions, "start/stop" serialization is employed in the present apparatus. The start of each byte is hence preceded by the transmission of a high level bit and following the end of the byte a low level is transmitted. Start/stop serialization provides better noise immunity and allows the use of simpler circuitry to allow bit-synchronization in comparison to asynchronous/non-continuous data stream.

In accordance with the present invention, data is recorded in a format that is compatible with the current standards for video signals. For example, the NTSC format is employed in the United States of America while the PAL and SECAM formats are employed in Europe.

Each video picture comprises two frames, each having 240 lines with certain lines reserved for vertical retrace. Two blocks of data are stored in each frame.

Each data block comprises data, sync information and error check information. The sync header is provided to synchronize the reading of data to the start of the occurrence of the data. The sync hunt scans for the TYPE, file ID and inverse file ID to indicate the start of a block. The TYPE field represents the type of block (i.e., header, data, or trailer block). Each block also contains a number relative to the first block and the number of blocks in a file to facilitate positioning of the tape during file searches. 512 bytes of data are then recorded, corresponding to the data stored on one sector of the magnetic disc in the disc drive. Two bytes are transmitted at the start of the last line, such bytes representing the CRC "sum" of the block and serve to provide error detection information in the playback mode. The TERM byte is transmitted at the end of the last line. Its purpose is to reset to CRC generator circuitry on the interface apparatus so that "good" CRC status is only possible for 2 byte times following the reception of the CRC byte. Since good CRC can only be sampled during this brief window, the hardware will be able to detect loss of synchronization errors in addition to determining CRC faults.

Each video frame also contains three buffer fields. The first field occurs during the vertical retrace signal and first few lines of the visible portion of the first block. The purpose of this buffer is to maintain compatibility with future recording formats that may generate their own information during the vertical retrace "blank" time. Interblock buffering allows for physical separation of blocks and hence avoids burst errors overlapping two adjacent blocks. A buffer at the end of the visible portion is necessary as the video tape recorder head leaves the tape near the bottom of the visible portion in order to ensure that it reads a good vertical retrace signal. Since during the time that the head leaves the tape until it again reaches the tape, no data can be recovered a buffer is included so as to isolate that time from the data blocks. As shown in FIG. 4 each block comprises 107 lines with each line containing five bytes of information stored as a serial bit stream.

The operation of the apparatus will now be described with reference to the record mode. Initially the apparatus is in an idle state. Sync pulses from the video timing generator 54 are transmitted to the controller 30 of the disc drive via the line 56 and the multiplexer 64. In the record mode the read/write control signal is in the write mode and appropriately supplies signals via input 84 to the control state machine 38, via input terminal 66 to the multiplexer 64, via input 98 to the shift register 40 and also to the multiplexer 43. The data/CRC select control signal selects for the data stream from the shift register 40 and in the record mode applies a control signal via line 130 to cause the multiplexer 126 to conduct and to the CRC generator 42. The controller also loads data onto the 8-bit data bus 28 arranged in a parallel format and sets the ready control signal applied via conductor 86 to a high condition. The generation of the ready control signal informs the interface apparatus that the data is ready on the data bus and this causes the data to be parallel loaded into the shift register 40. A strobe control signal is then returned via line 92 to the controller microprocessor when the data is accepted. In accordance with the state diagram previously illustrated, the control state machine transmits a start bit via line 88 which is added to the video sync signal via OR gate 132 and summer 134 so as to produce a white "bit" on the video signal indicating "start" (see FIG. 5).

In addition, a phi baud clock signal is generated by the reference signal generating circuit 34 and applied to the control state machine 38. After the next phi baud clock pulse, the start bit goes low in accordance with the state diagram. The first bit of data is then serially outputted to the video sum circuit 134 producing a black video signal if it is zero or a white video signal if it is one. At the next phi baud clock pulse, the data clock causes the shift register 40 to clock the next data bit to its serial output 106. This bit is then added to the video output signal. This process continues until all the bits are shifted out, e.g., after 8 clock pulses. Following the last data bit, the apparatus is idle for one clock period with a zero signal being output to the video summer 134 via the multiplexer 126 and the gate 132. This corresponds to the stop bit time shown in FIG. 5.

Also during the record mode, the output data stream from the shift register 40 is applied via output 106 through the multiplexer 43 and on line 112 to the input of the CRC generator 42. This information includes the sync header. Following the last data byte the CRC generator 42 receives a signal via the data/CRC select control input, causing it to switch into a write mode and thus to generate or write two bytes of CRC "sum" data for the block which are added to the video data stream. It is this sum data which is read during the playback mode to indicate the validity of the recorded data. The check sum hence appears on the video signal applied at the output of the summer 134 via the multiplexer 126 and the OR gate 132.

It should be recognized that the present invention includes an error correction fail safe technique. Each block of data from the disc drive is recorded twice on the video tape, once in the upper half of a video frame and again in the lower half of a video frame. This provides protection against problems associated with scratches on the video tape that may corrupt a number of blocks that are located in physically similar places on the tape. The staggering approach of the upper and lower halves of the frames, when combined with the acute angle that is employed by the video recorders when actually storing data, provide for a high degree of immunity to localized imperfections on the video tape. Even if both blocks are corrupted, it is still possible to recover the data in a very high percentage of cases. In this situation, the two blocks of data are compared to each other. Where the blocks contain the same data no error is assumed. In the comparison scheme, the blocks are compared from the start of each to find the first error and are also compared from the end of each block to find the last error. Since the nature of the errors is that of relatively short bursts, on the average of two to three bytes in length, the likelihood of the burst overlapping is quite small so that it can be assumed that the companion block will contain good data. Reconstructing the block is possible because the CRC bytes indicate the correct data. The first and last error positions are averaged and this position is used as a break point for reconstructing a good block. The first block is transmitted through the CRC checker up to a break point, then the remaining data is transmitted from the second block. If the bursts were masked, the CRC checker will indicate valid data, if not then the transmission order is reversed and the bursts will be masked out and the data accordingly recovered.

In the playback mode, also with reference to the state diagrams of the control state machines, the interface apparatus is initially in an idle state. Upon the application of the video input signal, the DC restore circuit 60 and the sync separator circuit 62 serve to separate the sync pulses from the video input signal. In particular, the input analog signal is "DC restored" by the DC restore circuit 60 to a level with zero volts as the level of the horizontal retrace pulses. The DC restored signal is passed through the sync separator 62 which serves to detect a voltage of zero volts which consequently separates the sync pulses and to provide a sync in pulse to input 68 of the multiplexer 64 at a time corresponding to the zero volt detection. The sync-in portion is transmitted via the input 68 through the multiplexer 64 and the line 72 to the controller in the disc drive. The read/write control signal is in the read mode and is applied to the control state machine 38, to the multiplexer 64 via conductor 66, to the multiplexer 43 and to the shift register at input 98. The restored signal is also applied to the comparator 74 and the data signal recovered by comparing the DC restored video signal to a reference voltage provided by the reference voltage source 76 midway between the white and black levels of a video signal corresponding to the voltage level 165 indicated in FIG. 5. The data signal containing data arranged in a serial format is then applied to the control state machine via input 80, to the shift register 40 via line 100 and to the multiplexer 43 which conducts it to the input of the CRC generator 42. The first high level out of the comparator 74 is interpreted by the control state machine 38 as a start bit and is signaled on line 88. This initiates the inputting of data. After a time corresponding to the duration of a phi baud clock pulse, the first bit of data is serially input to the shift register 40 after decoding a black as a zero level or a white as a one by virtue of the level of the reference voltage applied to the comparator 74. Upon the occurrence of the next phi baud clock pulse, the data clock pulse is applied by the control state machine to the shift register 40 which clocks the next data bit to the serial input. This process continues for 8 clock pulses until all the 8 bits are shifted into the shift register. Following the eighth data clock pulse, the last data bit is decoded and has been shifted into the shift register. The control state machine thereafter causes the generation of a strobe control signal to the controller to indicate that the next byte of data is available on the data bus 28. The shift register 40 is then in the idle condition and the control state machine reenters the wait condition on the occurrence of the next clock pulse. This corresponds to the stop bit time as illustrated in FIG. 5. When the controller is reading data, the ready control signal is present indicating that the controller is ready to accept data from the interface apparatus and the strobe control signal from the interface apparatus indicates the validity of data appearing on the data bus during the stop bit time.

In the error correcting scheme during the playback mode, the incoming data stream is input to the CRC generator 42. Following the occurrence of the second CRC byte, the CRC error status control indicator will change to indicate that the "sum" matches if no error has occurred. This signal is sampled by the controller on playback via the error status control signal output on line 122 and is used by the controller to validate the buffer data for synchronization and content.

It should be noted that in order to cram five bytes per horizontal line of a video signal and two blocks of data into a video field, the controller included in the disc drive must be able to respond and drive the interface apparatus within certain timing constrictions. The video format is determined by the interface apparatus but the data recording format (5 bytes per line, sync characters, etc.) is defined by the external interface.

In accordance with the present invention one horizontal line takes about 64 microseconds of which about 53 microseconds can be used for data transmission. The remaining portion or 11 microseconds must remain blank for the retrace pulse in accordance with video standards. In order to record the required 5 bytes of data on a line this 53 microsecond data transmission period must be divided into a minimum of 50 bit times, such time being in accordance with the requirement of 8 bits per data byte plus a start and a stop byte. The interface apparatus defines the bit time accordingly to be 0.9 microseconds which allows 5 bytes to occur within a 45 microsecond period. Consequently, for the microprocessor to place the bytes into the line in the prescribed period it must synchronize itself with the sync signal appearing on line 72 and be able to transmit the five bytes prior to the following occurrence of the sync pulse.

From the above, it will be seen that there has been provided a system including a disc drive having a non-removable magnetic storage medium, a video tape drive and an interface apparatus configured to provide a backup system for the information stored on the non-removable storage medium which fulfills all of the objects and advantages set forth above.

While the invention has been particularly shown and described with reference to a certain preferred embodiment, it will be understood by those skilled in the art that various alterations and modifications in form and detail may be made therein without departing from the invention. Accordingly, it is intended that the following claims cover all such alterations and modifications as fall within the true spirit and scope of the invention.

What is claimed is:

1. An interface apparatus between a video tape recorder (VTR) having a magnetic tape and a disc drive having a magnetic storage medium and a controller, said VTR for providing on said tape memory back-up to said disc drive, said tape for recording a video signal including a sync portion and a data portion, said controller for receiving a sync signal, an error status signal, and for generating a read/write signal; said interface apparatus comprising:

a data bus for transferring data between said controller and said interface apparatus;

means for generating a clock signal;

first means responsive to the video signal and operative to separate the sync and data portions and to develop said sync signal and a data signal therefrom when said controller is generating a read signal;

a control state machine responsive to the read/write signal, and the clock signal and for generating a start bit, a data clock and a shift signal in a predetermined sequence;

a shift register coupled to said first means and said control state machine and being responsive to the data signal, said data clock and said shift signal and operative to transform data from said data signal applied in a serial manner thereto into a parallel stream of data and to apply said parallel stream onto said data bus for transfer to the magnetic storage medium of the disc drive, when said controller is generating a read signal;

said shift register also being responsive to the data clock and shift signal and operative to transform data from said controller applied on said data bus in a parallel manner thereto into a serial stream of data, when said controller is generating a write signal;

second means responsive to the data signal and said data clock and operative to selectively develop said error status signal when said controller is generating a read signal, said error status signal being indicative of an error in the video signal recorded on said tape;

said second means also responsive to the serial stream of data from said shift register and for generating an error checking signal, when said controller is generating a write signal; and logic means for receiving said serial stream of data from said shift register, said error checking signal, said start bit, and said clock signal and for generating a video signal for recording on said tape.

2. Interface apparatus for providing memory back-up to a disc drive as recited in claim 1 wherein the magnetic storage medium is of the non-removable type.

3. Interface apparatus for providing memory back-up to a disc drive as recited in claim 2 wherein said data bus carries 8 bits of data.

4. Interface apparatus for providing memory back-up to a disc drive as recited in claim 1 wherein said means for generating a clock signal includes an oscillator and dividing circuits coupled to said oscillator for developing said clock signal at a predetermined frequency to provide a selected video format on said video signal.

5. Interface apparatus for providing memory back-up to a disc drive as recited in claim 1 wherein said first means includes a DC restore circuit and a sync separator circuit for separating said sync portion.

6. Interface apparatus for providing memory back-up to a disc drive as recited in claim 5 and further comprising a multiplexer coupled to said sync separator and said means for generating a clock signal and said read/write signal, said multiplexer serving to develop the sync signal when the read signal is supplied.

7. Interface apparatus for providing memory back-up to a disc drive as recited in claim 1 wherein said second means includes a first multiplexer coupled to said shift register and said first means said multiplexer responsive to said read/write signal for selectively conducting the data signal, from said first means or from said shift register, to said second means.

8. Interface apparatus for providing memory back-up to a disc drive as recited in claim 7 wherein said logic means further includes a first multiplexer coupled to said shift register and said second means and responsive to a data/CRC select signal from said controller for conducting the data signal from the shift register or from the second means, when the controller is generating a write signal.

9. Interface apparatus for providing memory back-up to a disc drive as recited in claim 1 wherein said logic means further comprising a multiplexer coupled to said shift register and said CRC generator for selectively conducting one of the signals supplied thereto, an OR gate coupled to said multiplexer and said control state machine and serving to conduct data signal when the control state machine generates said start bit, and a summer coupled to said OR gate and said means for generating a clock signal and operative to conduct said data signal upon the occurrence of a clock signal.

10. A data processing system comprising:
   a disc drive having a magnetic storage medium and a controller, said controller for receiving a sync signal, an error status signal, and for generating a read/write signal;
   a video tape recorder (VTR) having a magnetic tape and for providing on said tape memory back-up to said disc drive, said tape for recording a video signal including a sync portion and a data portion;
   interface apparatus including a data bus connected to the disc drive for transferring data between said controller and said interface apparatus, said apparatus comprising:
   means for generating a clock signal;
   first means responsive to the video signal and operative to separate the sync and data portions and to develop said sync signal and a data signal therefrom, when said controller is generating a read signal;
   a control state machine responsive to the read/write signal, and the clock signal and for generating a start bit, and a data clock and a shift signal in a predetermined sequence;
   a shift register coupled to said first means and said control state machine and being responsive to the data signal, said data clock and said shift signal and operative to transform data from said data signal applied in a serial manner thereto into a parallel stream of data and to apply said parallel stream onto said data bus for transfer to the magnetic storage medium of the disc drive when said controller is generating a read signal;
   said shift register also being responsive to the data clock and shift signal and operative to transform data from said controller applied on said data bus in a parallel manner thereto into a serial stream of data, when said controller is generating a write signal;
   second means responsive to the data signal and said data clock and operative to selectively develop said error status signal when said controller is generating a read signal, said error status signal being indicative of an error in the video signal recorded on said tape;
   said second means also responsive to the serial stream of data from said shift register and for generating an error checking signal, when said controller is generating a write signal; and
   logic means for receiving said serial stream of data from said shift register, said error checking signal, said start bit, and said clock signal and for generating a video signal for recording on said tape.

11. A data processing system as recited in claim 10 wherein said logic means further comprising a multiplexer coupled to said shift register and said CRC generator for selectively conducting one of the signals supplied thereto, an OR gate coupled to said multiplexer and said control state machine and serving to conduct the data signal when the control state machine generates said start bit, and a summer coupled to said OR gate and said means for generating a clock signal and operative to conduct said data signal upon the occurrence of a clock signal.

12. A data processing system as recited in claim 10 wherein the magnetic storage medium is of the nonremovable type.

13. A data processing system as recited in claim 12 wherein the data bus carries 8 bits of data.

14. A data processing system as recited in claim 10 wherein said means for generating a clock signal includes an oscillator and dividing circuits coupled to said oscillator for developing said clock signal at a predetermined frequency to provide a selected video format on said video signal.

15. A data processing system as recited in claim 10 wherein said first means includes a DC restore circuit and a sync separator circuit for separating said sync portion.

16. A data processing system as recited in claim 15 and further comprising a multiplexer coupled to said sync separator and said means for generating a clock signal and said read/write signal, said multiplexer serving to develop the sync signal when the read signal is supplied.

17. A data processing system as recited in claim 10, wherein said second means includes a first multiplexer coupled to said shift register and said first means said multiplexer responsive to said read/write signal for selectively conducting the data signal, from said first means or from said shift register, to said second means.

18. A data processing system as recited in claim 17 wherein said logic means further includes a first multiplexer coupled to said shift register and said second means and responsive to a data/CRC select signal from said controller for conducting the data signal from the shift register or from the second means, when the controller is generating a write signal.

* * * * *